United States Patent [19]
Betts et al.

[11] Patent Number: 4,745,660
[45] Date of Patent: May 24, 1988

[54] UNIVERSAL SHRIMP PEELING MACHINE

[75] Inventors: Edmund D. Betts, Libertyville; Jon T. Keith, Wheeling; James E. Pershinske, Carpentersville, all of Ill.

[73] Assignee: Gregor Jonsson Associates, Inc., Highland Park, Ill.

[21] Appl. No.: 75,087

[22] Filed: Jul. 20, 1987

[51] Int. Cl.$^4$ ............................................. A22C 29/02
[52] U.S. Cl. ........................................................ 17/73
[58] Field of Search .............................. 17/71, 72, 73

[56] References Cited

U.S. PATENT DOCUMENTS 3,247,542  4/1966  Jonsson ................................... 17/73
4,507,825  4/1985  Betts et al. .............................. 17/73

Primary Examiner—Willie G. Abercrombie
Attorney, Agent, or Firm—Marshall, O'Toole, Gerstein, Murray & Bicknell

[57] ABSTRACT

A machine for peeling a shell from shrimp comprising a movement device, a plurality of clamp assemblies mounted on and moved by the device past a number of processing stations. In the first style of processing wherein the entire shell is removed, the operative stations include a cutting station, a deveining station, and a meat removal station. In the second style wherein the tail and the first shell section are allowed to remain on the meat, there is also an operative disjointing station wherein the joint or connection between the first and second shell sections is broken. Each clamp assembly includes a tail clamp, a shell disjointing clamp, and a main body clamp, and cam devices are provided for operating the clamps. An actuating mechanism having an active position and an inactive position is provided, this mechanism having interconnected parts at the disjointing station and at the meat removal station. When in the active position, the mechanism operates the cams at the disjointing station to disconnect the first and second shell sections, and the cams at the meat removal station to disengage the tail clamps. When in the inactive position the mechanism does not operate the disjointing clamps and the tail clamp at the meat removal station is not disengaged.

7 Claims, 6 Drawing Sheets

UNIVERSAL SHRIMP PEELING MACHINE

FIELD AND BACKGROUND OF THE INVENTION

This invention relates to apparatus for peeling and deveining shrimp.

Various machines are known and in use for automatically removing the shell and the vein of shrimp. Machines of this nature are described, for example, in U.S. Pat. Nos. 4,281,436, 4,439,893 and 4,472,858. Another example of this type of machine is disclosed in E. D. Betts pending patent application Ser. No. 897,078 filed Aug. 18, 1986. The disclosures in the latter two patents and the pending application are incorporated herein by reference.

In a machine of the nature shown in the above application, shrimp to be processed are manually loaded into trays which move the shrimp to a turret wheel type of arrangement, the wheel carrying a number of clamp assemblies of its outer periphery. The shrimp are held by the clamp assemblies and moved in a circular path past a blade for cutting a groove along the backside of the shrimp, then past a brush and water jets for removing the vein, then past a set of forks for pulling the meat out of the shell, and finally past a device for removing the empty shell.

There are two styles or modes of processing and selling shrimp. In one mode, the entire shell of the shrimp is removed from the meat, and in the other mode, the tail and the first shell section remain on the meat while the remainder of the shell is removed. The latter style, being more difficult to produce, is able to command a higher market price.

In the past since the processing of the two styles are quite different, machines of different designs have been necessary. Consequently it has been necessary for a processor to purchase two types of machines, one for each style. This is of course a disadvantage because of the expense, space, etc. required.

It is a general object of the present invention to provide an improved machine which has the capability of being operated in both styles and which may be quickly and easily converted from one style to the other.

SUMMARY OF THE INVENTION

A machine in accordance with the present invention comprises a movement device, a plurality of clamp assemblies mounted on and moved by the device past a number of processing stations. In the first style of processing wherein the entire shell is removed, the operative stations include a cutting station, a deveining station, and a meat removal station. In the second style wherein the tail and the first shell section are allowed to remain on the meat, there is also an operative disjointing station wherein the joint or connection between the first and second shell sections is broken.

Each clamp assembly includes a tail clamp, a shell disjointing clamp, and a main body clamp, and cam devices are provided for operating the clamps. An actuating mechanism having an active position and an inactive position is provided, this mechanism having interconnected parts at the disjointing station and at the meat removal station. When in the active position, the mechanism operates the cams at the disjointing station to disconnect the first and second shell sections, and the cams at the meat removal station to disengage the tail clamps. When in the inactive position the mechanism does not operate the disjointing clamps and the tail clamp at the meat removal station is not disengage.

BRIEF DESCRIPTION OF THE DRAWINGS

The invention will be better understood from the following detailed description taken in conjunction with the accompanying figures of the drawings, wherein.

DETAILED DESCRIPTION

Figure 1:
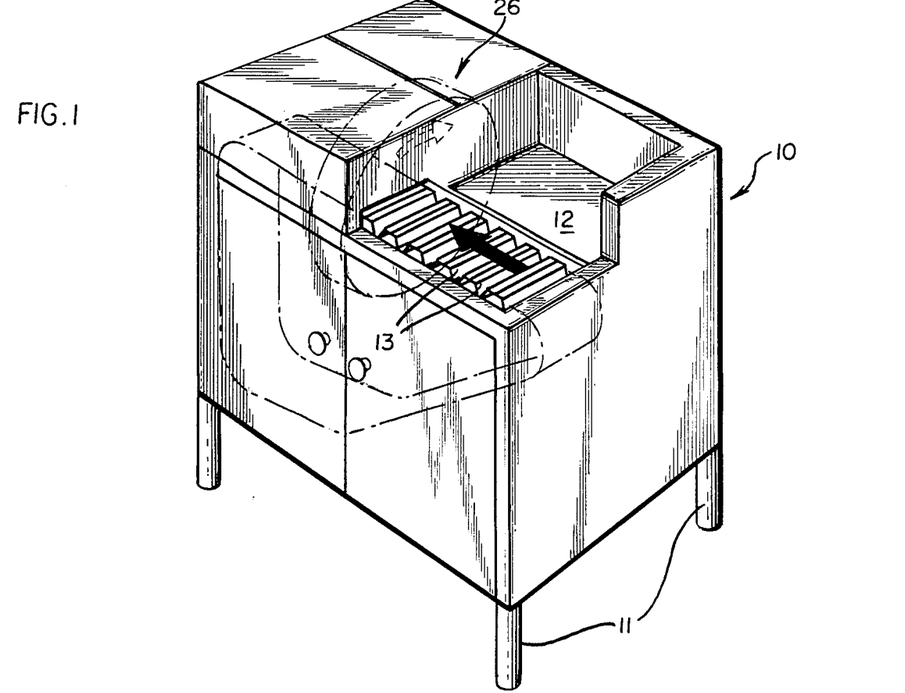
FIG. 1 is a perspective view of a machine including apparatus in accordance with this invention.

With reference first to FIG. 1, the machine includes a housing 10 which encloses the operative parts of the machine. The housing is supported by conventional legs 11, and on its upper surface is formed a receptacle 12 where raw shrimp are piled. A conveyer including a plurality of trays 13 are adjacent the receptacle 12, and during operation of the machine, an operator removes shrimp from the receptacle and places them in the trays. The above construction is illustrated and described in more detail in the foregoing mentioned pending patent application.

Figures 2, 3:
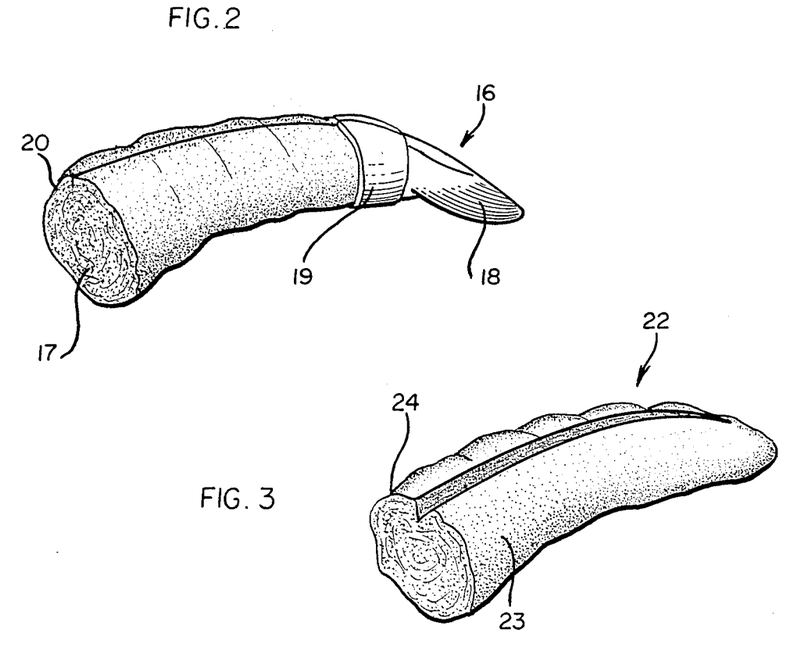
FIG. 2 is a perspective view of a shrimp processed in accordance with one style and including the tail and one shell section.
FIG. 3 is a view similar to FIG. 2 but showing a shrimp processed in accordance with another style wherein the entire shell is removed.

The shrimp 16 shown in FIG. 2 includes a meat portion 17, a tail 18 at one end of the meat 17, a first shell section 19 connected to the tail, and a slit or cut 20 extending along the back side of the meat. The vein of the shrimp is removed from the slit, and all of the shell sections are removed with the exception of the section 19. The shrimp 22 shown in FIG. 3 includes a meat or body portion 23 having a slit 24 formed in it, but in this style, all of the shell sections and the tail are removed. The apparatus in accordance with this invention is capable of producing both styles of processed shrimp.

Figure 4:
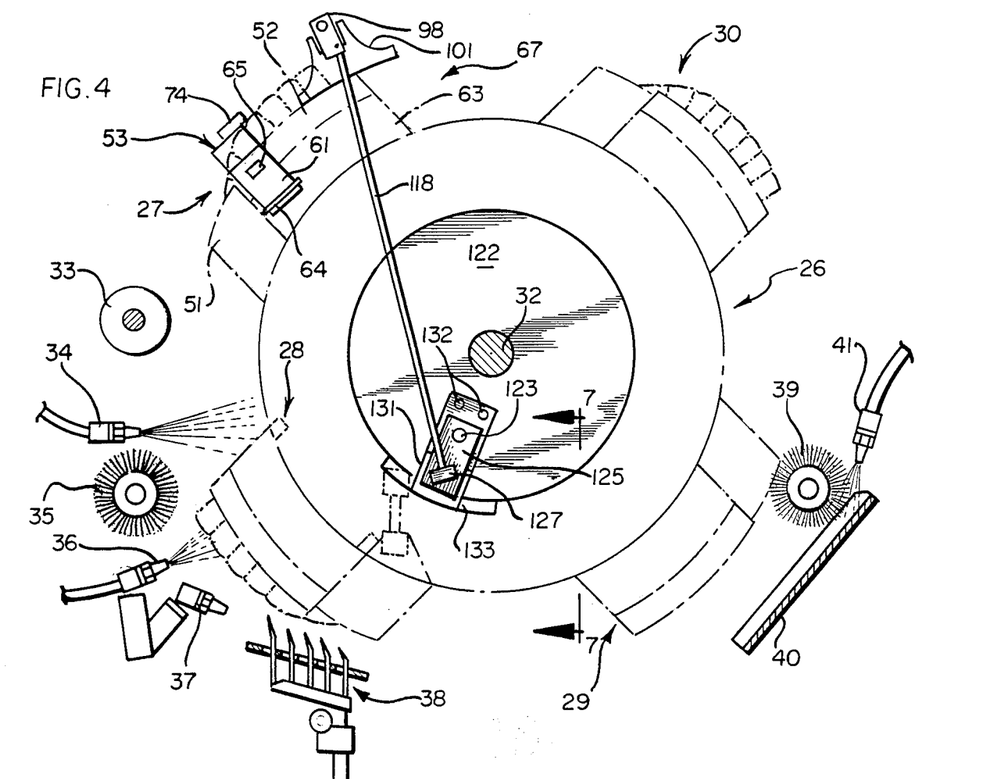
FIG. 4 is a sectional view on the line 4—4 of FIG. 7 and showing a plan view of apparatus in accordance with this invention.
Figure 7:
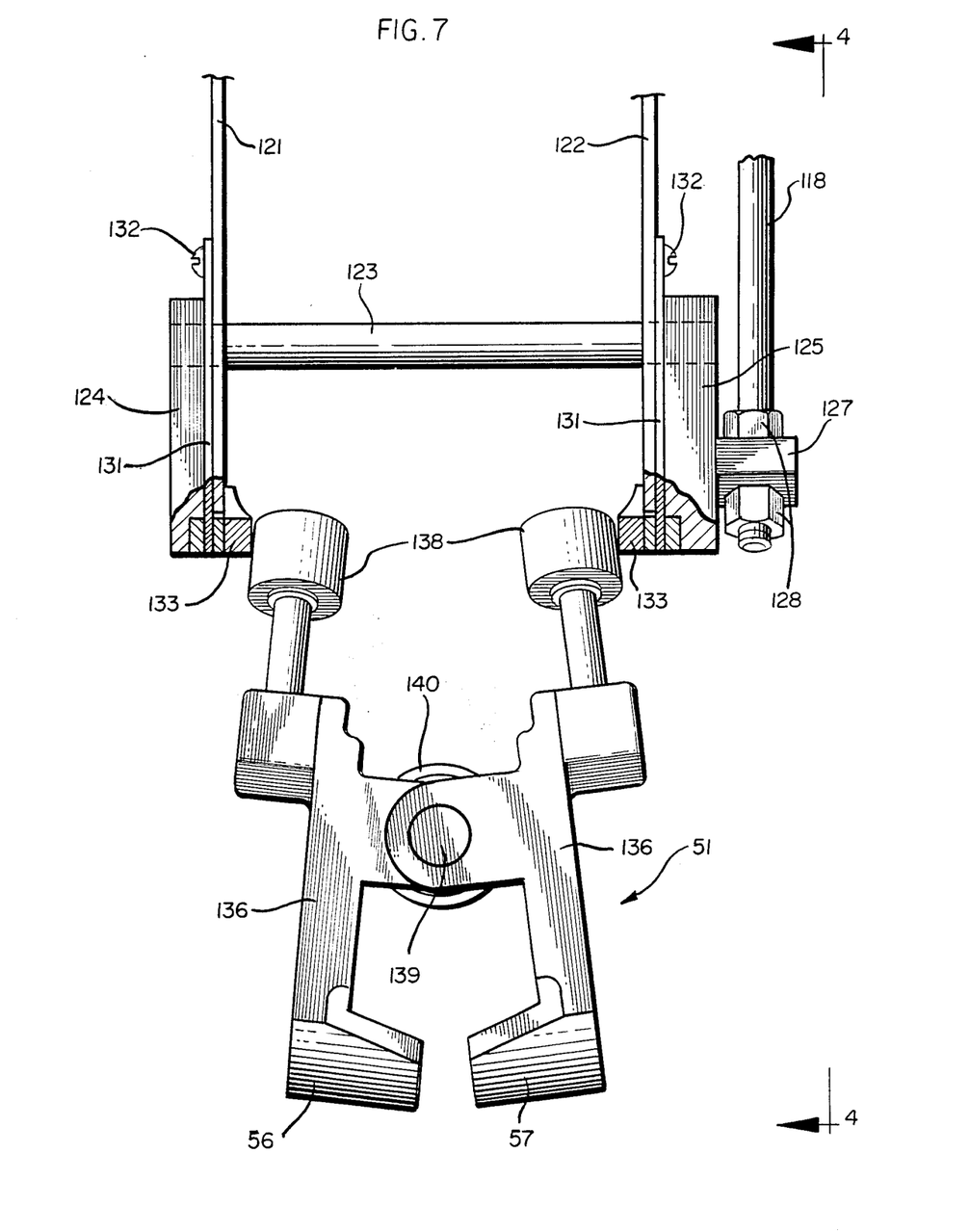
FIG. 7 is an enlarged view of part of the apparatus along line 7—7 of FIG. 4 in the active position.
Figure 8:
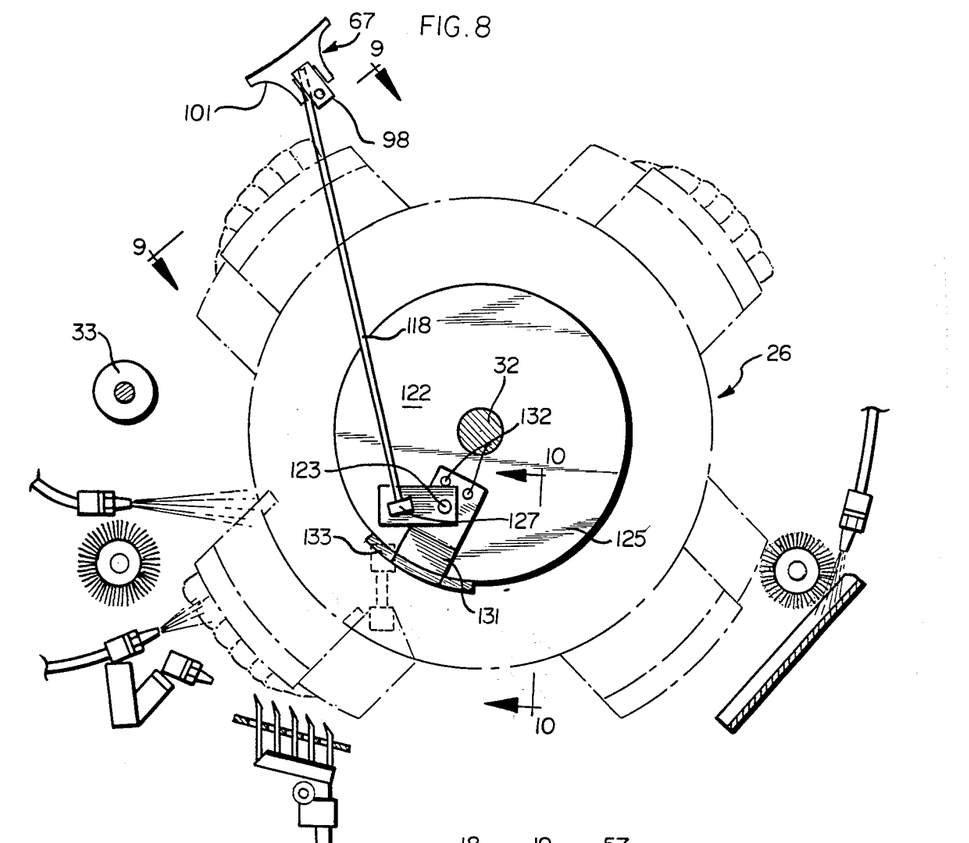
FIG. 8 is a view similar to FIG. 4 but showing the apparatus in the inactive position.

With specific reference to FIGS. 4 and 8, mounted within the housing 10 is a turret-type movement device 26 (also shown in dash-dot lines in FIG. 1) which carries a plurality of clamp assemblies. In the present specific example, the device 26 is in the shape of a circular drum and four clamp assemblies 27 to 30 are mounted at equally spaced positions around the outer periphery of the drum. The device 26 rotates on shaft 32 which is supported on a frame within the housing 10. The above mentioned application describes the support and a drive mechanism for the device 26 in detail. Two spaced apart cam support disks 121 and 122 (also see FIG. 7) are mounted adjacent to the drum or device 26 and fixed on shaft 32. Also shown in FIG. 4 (and described in the above application) are a rotatable knife blade 33, a water nozzle 34 and a brush 35 for removing the vein, water nozzles 36 and 37 and a fork assembly 38 for removing the meat from the shell, and a rotatable brush 39 for removing the shell from the clamp assemblies. The shell slides down a chute 40 and is discarded and a water nozzle 41 cleans the brush and moves the shell down the chute. During operation, the device 26 rotates on shaft 32 in the counterclockwise direction as seen in FIG. 4. Shrimp held by the clamp assemblies are moved successively past the knife 33 which forms a cutting station, the brush 35 which forms a deveining station, the fork assembly 38 which forms a meat removal station, and the brush 39 which forms a shell removal station.

Figure 5:
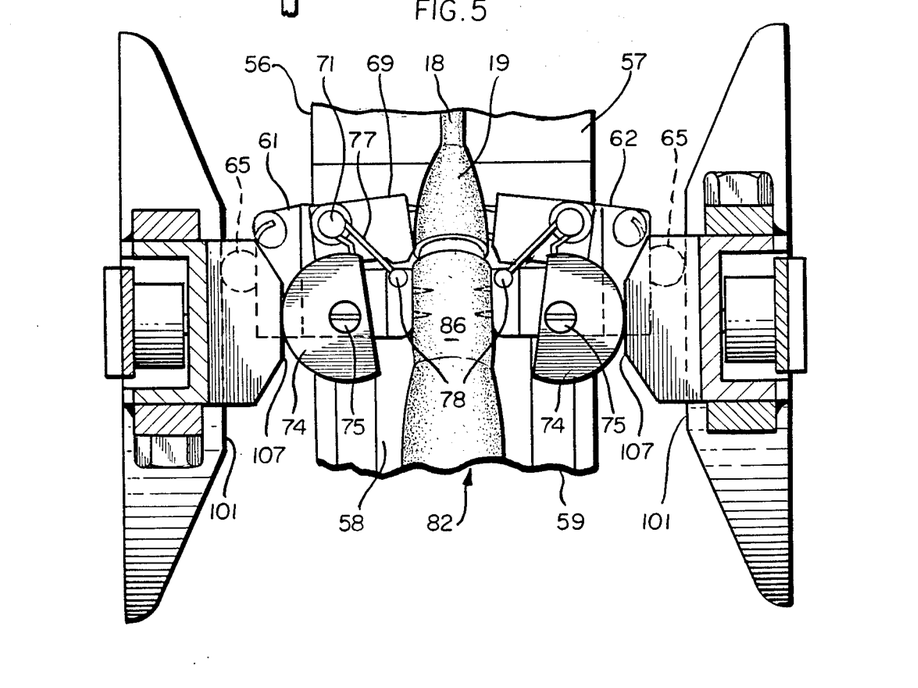
FIG. 5 is an enlarged view partially in section of part of the apparatus.
Figures 6, 6A:
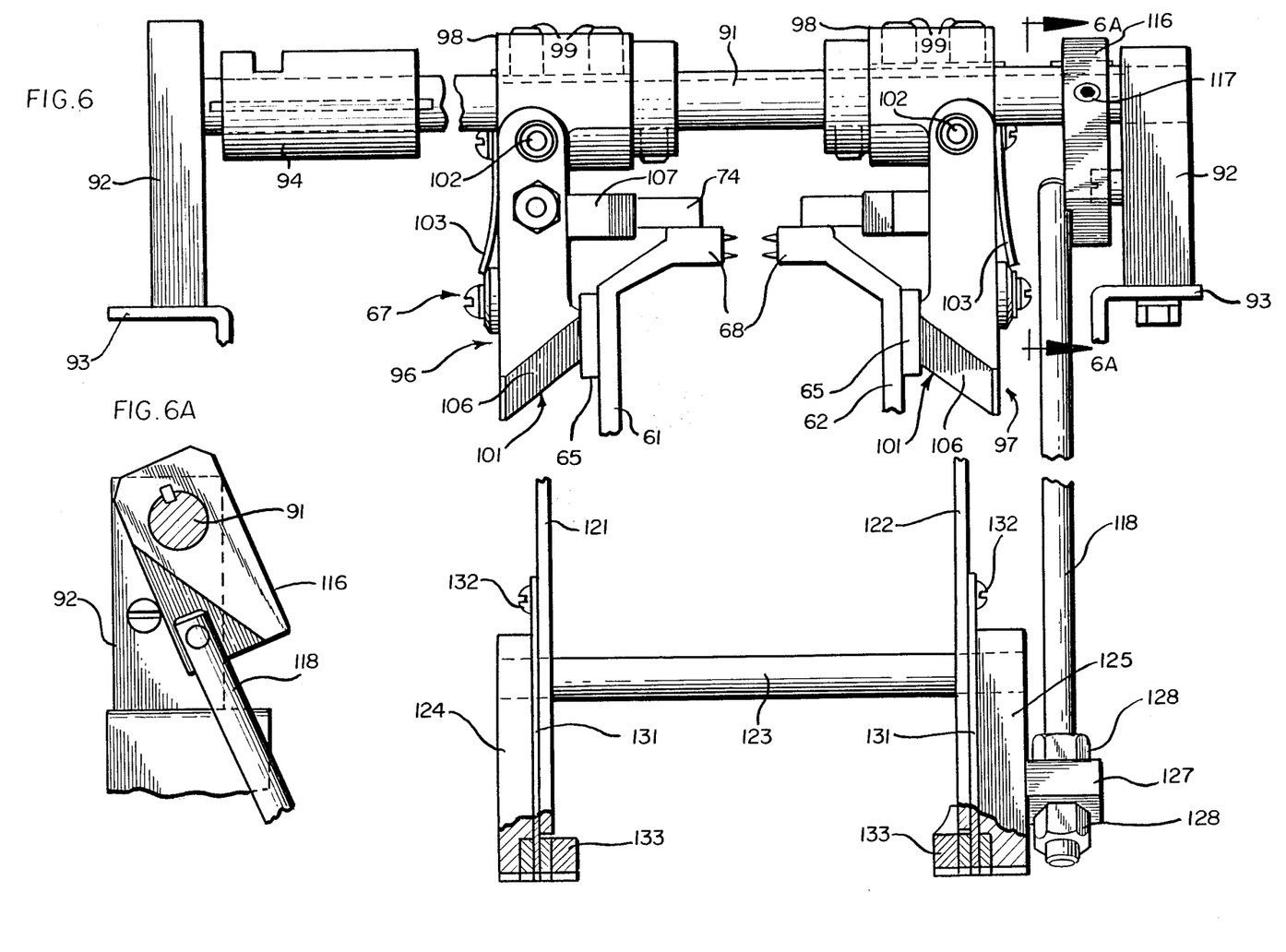
FIG. 6 is an enlarged view of part of the apparatus.
FIG. 6A is a sectional view taken of the line 6A—6A of FIG. 6.
Figure 9:
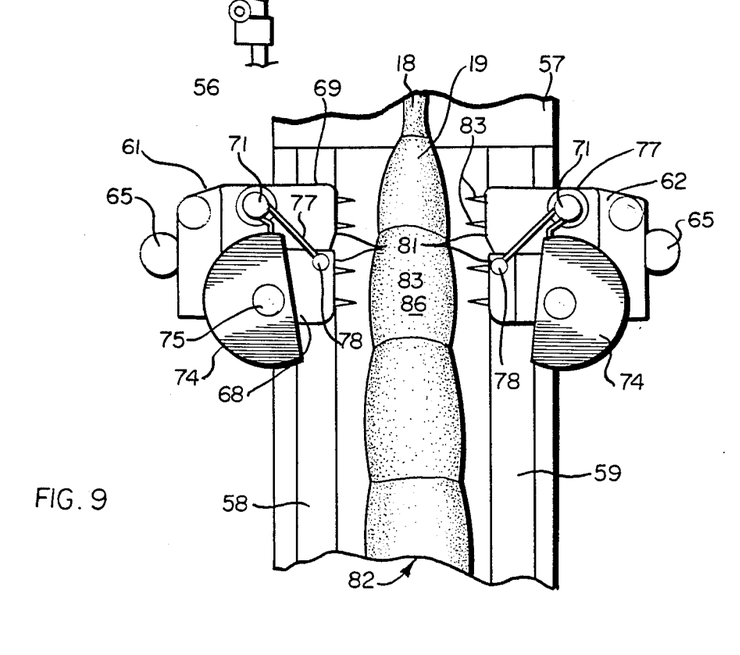
FIG. 9 is an enlarged view showing a shell section clamping mechanism.

As previously mentioned, four clamp assemblies are mounted on the periphery of the moving device 26, and the four assemblies 27 to 30 are essentially identical. With specific reference to the clamp assembly 27, for example, it includes a small or tail clamp 51, a large or body clamp 52, and a disjointing clamp 53. The construction and operation of the tail and body clamps 51 and 52 are described in detail in the above-mentioned pending application and therefore will not be described herein, and the disjointing clamp 53 is also known. Only the disjointing clamps 53 for the assembly 27 is shown in FIG. 4 for the sake of clarity of these figures, but the clamps 53 are shown in FIGS. 5, 6 and 9. Substantially identical disjointing clamps are provided for all of the clamp assemblies.

The tail clamp 51 includes two clamp jaws 56 and 57 which are mounted on the device 26 for movement toward and away from each other (horizontally as seen in FIG. 5). A spring 140 (FIG. 7) normally biases the jaws 56 and 57 toward each other, and cams fixed to the disks 121 and 122 engage cam followers 138 on the radially inner ends of the jaws at certain parts of the travel of the assemblies in order to open the jaws. At a feeding station, which is located approximately at the position of the clamp assembly 30 in FIG. 4, the cams open the tail jaws 56 and 57 so that the tail of a shrimp may be placed between the adjacent sides of the jaws. After the clamp assembly has moved counterclockwise a short distance, the tail jaws move out of engagement with these cams and the tail jaws automatically close due to the spring action. In one mode of operation, as will be described, the tail jaws remain closed until the meat removal station adjacent the fork assembly 38, thereby producing the shrimp shown in FIG. 2. In the other mode of operation the tail jaws remain closed until the shell removal station adjacent the brush 39 to produce the shrimp shown in FIG. 3.

The large or body clamp 52 also includes two jaws 58 and 59 (FIGS. 5 and 9) which are similarly biased toward each by another spring (not shown). Separate cams operate the jaws 58 and 59 to open them at approximately the same time that the tail jaws are opened at the feeding station and then to allow them to close shortly after the tail jaws have closed. The body clamp remains closed until it reaches the shell removal station adjacent the brush 39 when they are opened.

The disjointing clamp 53 of each clamp assembly includes radially extending support bars 61 and 62 (shown in FIGS. 4, 5 and 6) which are pivotably mounted on the clamp support frame 63 by pins 64 so that the radially outer ends of the bars 61 and 62 may move toward or away from each other. A spring (not shown) engages each support bar 61 and 62 and urges the bars to the spaced apart position shown in FIG. 9. A cam follower 65 is mounted on the outer side of each bar 61 and 62 and is engageable with a cam of an actuating mechanism 67 when the mechanism 67 is in its active position shown in FIGS. 4, 5 and 6.

On the upper end of each support bar 62 are mounted a stationary clamp 68 and a movable clamp 69. With reference to FIG. 5, the movable clamp 69 is L shaped and it is pivotally mounted on the support bar 62 by a pivot pin 71 which is located at the juncture of the two arms of the clamp 69. A cam follower 74 is fastened to the upper side of the clamp 69 by a screw 75, and a torsion spring 77 urges the clamp 69 in the clockwise direction as seen in FIG. 5. In a similar way, spring 77 urges clamp 69 on support bar 62 in the counterclockwise direction. The spring 77 is turned around the pin 71 and has one end engaging the cam follower 74 and the other end held by a pin 78 on the stationary clamp 68. The normal position of the clamp 69 relative to the clamp 68 and the bar 62 is shown in FIG. 9, and it will be seen that both clamps 68 and 69 have flat inner sides 81 which face a shrimp 82 being processed. Pins 83 are mounted on and extend inwardly from the sides 81 and toward the shrimp 82, as best shown in FIG. 9.

As is also shown in FIGS. 5 and 9, the two clamps 68 and 69 on each side of the shrimp are located relative to each other and to the tail clamp 51 so that the pins of the stationary clamp 68 are engageable with the second shell section 86 of the shrimp 82 while the pins of the movable clamp 69 are engageable with the first shell section 19 closely adjacent the shell section 86.

FIG. 6 illustrates the actuating mechanism 67 in greater detail and shows the mechanism in its active or operating position wherein the machine produces shrimp with the tail 18 and the first shell section 19 intact on the meat. The mechanism 67 includes a pivot shaft 91 which has its ends journaled on two supports 92 mounted of the frame 93 of the machine. While not necessary, a device 94 may be provided on the shaft 91 for toggling the shaft 91 to either one position or the other and holding the shaft in a given position.

Fastened to the shaft on the outer sides of the clamp assemblies are two sets of cams 96 and 97 which are essentially identical. Each set of cams includes a mounting block 98 fastened to the shaft 91 by set screws 99. Extending radially (with respect to the shaft 91) outwardly from each block 98 is a tail breaker cam 101 which is pivotally mounted on the block 98 by a pin 102. A leaf spring 103 connected between the block 98 and the radially outer portion of the cam 101 urges the outer end of the cam 101 inwardly (toward the clamp assemblies). The cam follower 65 is fastened to the outer side of each support bar 61 and 62 of the disjointing clamps as mentioned above, and the cam 101 on each side has a cam surface 106 located to engage the associated follower 65 and to pivot the bars 61 and 62 and the clamps 68 and 69 inwardly toward a shrimp which is being held by the tail and body clamps. As shown in FIGS. 4 and 5, the cam surfaces 106 have an extended arcuate length and they press the clamps 68 and 69 inwardly against the sides of the shrimp.

Also mounted on each mounting block 98 is a disjoint cam 107 which is located to engage the associated follower 74 (see FIG. 6) during the time that the cam surfaces 106 engage the followers 65. When the cams 107 and followers 74 engage, the followers 74 are moved inwardly and the clamps 69 pivots of the pin 71. This action causes the cams 68 and 69 on each side of the shrimp to spread apart as shown in FIG. 5. As previously mentioned, the pins 83 on the clamps 68 and 69 engage or prick into the sides of the first and second shell sections, and the spreading action of the cams 68 and 69 pulls the two shell sections apart and breaks the joint between them. After the joint has been broken, the rotational movement of the drum or device 26 moves the followers 65 and 74 out of engagement with the cams 106 and 107, and the disjointing clamps pull back away from the opposite sides of the shrimp.

Also attached to the pivot shaft 91 is a lever bar 116 (FIGS. 6 and 6A) which is fastened by a set screw 117. The bar 116 extends radially outwardly and adjacent its outer end it is pivotably attached to a link rod 118 which extends generally downwardly (see FIG. 4) to adjacent the fork assembly 38 at the meat removal station.

As previously mentioned, the apparatus includes two axially spaced cam support disks 121 and 122 which are fixed to shaft 32 which is fixed to the machine frame. The various cams for operating the followers on the clamp assemblies 27 to 30 are mounted on the two disks 121 and 122, and the drum or movement device 26 is coaxially mounted adjacent to the disks. As shown in FIG. 4, the shaft 32 on which the device 26 rotates extends through the disks.

Figure 10:
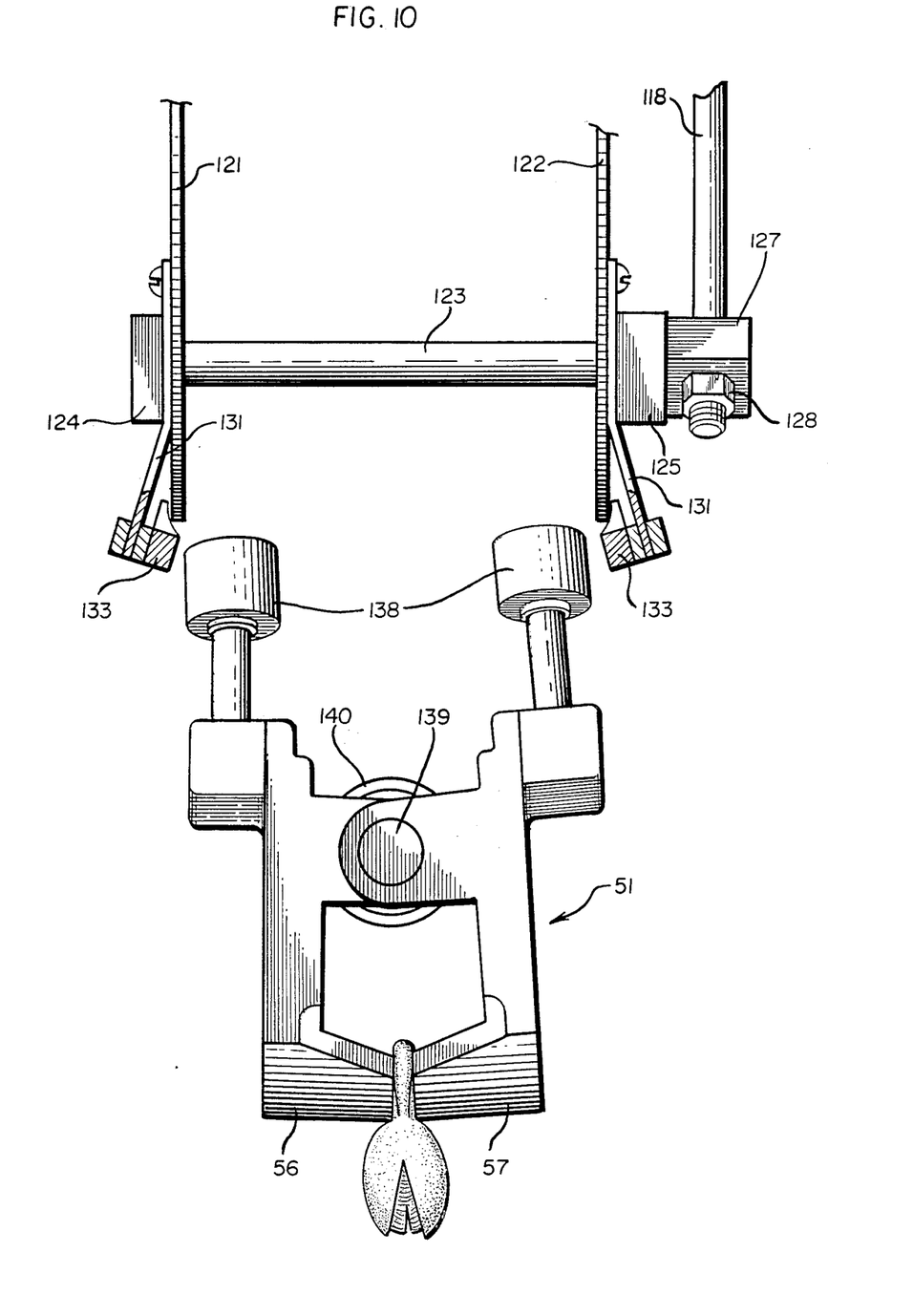
FIG. 10 is a view along line 10—10 of FIG. 8 similar to FIG. 7 but showing the apparatus in the inactive position.

With specific reference to FIGS. 7 and 10, a pivot shaft 123 extends through the two disks 121 and 122 parallel to the axis of the disks and adjacent the meat removal station. The shaft 123 is pivotably mounted on the disks and two cam actuating plates 124 and 125 are secured to the ends of the shaft 123. A block 127 is secured to the outside surface of the plate 125 and the block 127 is coupled to the lower end of the link 118 by two nuts 128. As a consequence, when the link 118 is moved upwardly or downwardly the plates 124 and 125 and the shaft 123 as caused to move between the two positions shown in FIGS. 4 and 8.

Between each of the plates 124 and 125 and the adjacent disks 121 and 122 is mounted a cam support leaf 131. The leaves 131 are secured at their upper ends by screws 132 to the outside surfaces of the disks and their lower ends extend downwardly to slightly below the outer edges of the disks. Cams 133 are secured to the inner faces of the two leaves 131 and are located to operate the small or tail clamps of the clamp assemblies. With reference to FIGS. 7 and 10, each tail clamp 51 includes two jaw supports 136 which extend radially and have the clamp jaws 56 and 57 at their outer ends and cam followers 138 at their inner ends. A pin 139 pivotably connects the two supports 136 and a torsion spring 140 urges the jaws 56 and 57 toward each other. When the cams 133 are moved to their active positions shown in FIGS. 6 and 7, the cams 133 engage the followers 138 and pivot the jaws away from each other as the drum 26 moves a tail clamp 51 past the cams 133. When the rod or link 118 is moved downwardly the plates 124 and 125 swing on the axis of the shaft 123 to the positions shown in FIGS. 6 and 7 where the plates overlie the outer ends of the leaves 131 and thereby press the leaves (and the cams 133) toward each other. On the other hand, when the link 118 is displaced upwardly to the inactive position shown in FIGS. 8 and 10, the outer ends of the plates are clear of the outer ends of the leaves 131 and the inherent spring action of the leaves causes them to flex outwardly and move the cams away from each other. As shown in FIG. 10, in this instance the followers 138 are able to pass between the cams 133 without being engaged by them.

Considering the operation of the machine as a whole, assume first that it is desired to produce shrimp as shown in FIG. 3 wherein the entire shell is removed. The pivot shaft 91 is manually rotated to the inactive position where the cam supports 98 are displaced upwardly as shown in FIG. 8. The cams 101 and 107 are spaced from the followers 65 and 74 of the disjointing clamps 68 and 69 and consequently the clamps are not moved to engage the sides of a shrimp being held by the tail and body clamps. Further, the plates 124 and 125 are swung away from the cams 133 and the cams 133 are displaced from the followers 138.

When a shrimp is fed through the machine, its tail is first clamped and held by the tail clamp and then the body of the shrimp is clamped and held by the body clamp. The disjointing clamps remain spread apart and inoperative throughout this mode of operation. The shrimp is cut by the knife 33, the vein is removed and the meat is removed from the shell and the tail (both of which remain clamped) during the meat removal step at the fork assembly 38. The tail and body clamps are opened at the shell removal station by cams (not shown) to complete the cycle.

Now assume that it is desired to produce shrimp as shown in FIG. 2 where the tail 18 and the first shell section 19 remain on the meat 17. The shaft 91 is manually turned to the active position shown in FIGS. 4, 5, 6 and 7. The cam supports 98 extend radially inwardly from the shaft 91 and the cams 101 and 107 are located to engage the followers 65 and 74, respectively. Further the link 118 is moved downwardly and the two plates 124 and 125 are moved to where their outer ends overlie and press inwardly on the outer ends of the two leaves 131, whereby the cams 133 are engageable with the followers 138.

In these positions of the parts, when a clamp assembly with a shrimp held by the body and the tail moves past the cams 101 and 107, they engage the followers 65 and 74. First the followers 65 are engaged and the pins 83 of the clamps 68 and 69 are pressed into the sides of the first and second shell sections 19 and 86 of the shrimp. Then the followers 74 engage the cams 107 and the clamps 69 are pivoted of the pins 71, causing the clamps 68 and 69 to spread apart. This spreading action pulls the first and second shell sections away from each other and breaks the joint between them as shown in FIG. 5.

As the movement device continues to rotate the shrimp is cut and deveined and is then moved to the meat removal station. The followers 138 of the tail clamp engage the cams 133 just before and during the time that the fork assembly 38 engages the meat of the shrimp. When the fork assembly pulls away the meat, the tail and the first shell section are also removed along with the meat because the tail is not clamped and remains with the meat and the first shell section is only loosely held by the body clamp and is attached to the meat and the tail. The clamp assembly then moves to the shell removal station where the remainder of the shell is removed.

It will be apparent from the foregoing that a novel and useful invention has been provided. Since the machine may be operated in either of two modes, only a single machine is required whereas two differently constructed machines were previously needed to process the two styles of shrimp. In the prior art machine designed to produce shrimp 16 as shown in FIG. 2, disjointing clamps generally as described herein were provided but they were actuated by immovably mounted cams on the disks, and, similarly, immovably mounted cams were mounted on the disks for operating the tail clamp followers at the meat removal station. In the other prior art machine for producing the shrimp 22 shown in FIG. 3, the disjointing clamps and the associated cams were not included, and no cams were provided at the meat removal station to momentarily open the tail clamp. In contrast with the foregoing prior art machines, apparatus in accordance with this invention includes the disjointing clamps and the cams and further includes mechanisms for making these parts operative or inoperative.

We claim as our invention:

1. A machine for peeling shrimp and having a loading station, a cutting station, a deveining station, a meat removal station and a shell removal station, comprising moving means, a plurality of clamp assemblies mounted on and carried by said moving means, each of said clamp assemblies including a body clamp, a tail clamp and a disjointing clamp, said body and tail clamps being operable respectively to clamp the body and the tail of a shrimp when engaged and said disjointing clamp being operable when engaged to break a joint between two shell parts of a shrimp, first cam means mounted adjacent said moving means for engaging said disjointing clamp, said first cam means being movably mounted and movable between an active position where it engages said disjointing clamp and an inactive position where it disengages said disjointing clamp, a second cam means mounted adjacent said moving means adjacent said meat removal station, said second cam means having an active position where it engages said tail clamp and an inactive position where it disengages said tail clamp, and movable connecting means between said first and second cam means for simultaneously moving said first and second cam means between said active and said inactive positions.

2. A machine according to claim 1, wherein said first cam means is mounted between said loading and cutting stations.

3. A machine according to claim 1, wherein said first cam means includes a pivot shaft and cams mounted on said pivot shaft, said shaft and said cams being rotatable between said active and inactive positions.

4. A machine according to claim 3, wherein said connecting means comprises a link coupled to said pivot shaft to be moved in the direction of its length as said pivot shaft is rotated.

5. A machine according to claim 4, wherein one end portion of said link is coupled to said shaft and the opposite end portion is coupled to said second cam means.

6. A machine according to claim 5, wherein said second cam means comprises a leaf spring having a movable end that is flexible between an active position and an inactive position, a cam on said movable end of said spring, a movable support block adjacent said spring for moving said movable end to said active position, and said opposite end portion of said link being connected to said movable block.

7. In a shrimp cleaning machine comprising a rotatable clamp support drum, a plurality of clamp supports fastened adjacent the periphery of said drum, each of said assemblies including cam actuatable tail holding clamps and disjointing clamps, the improvement comprising a pivot shaft mounted adjacent said drum and having first cams thereon for operating said disjointing clamps, said shaft being rotatable to an active position where said first cams are engageable with said disjointing clamps and to an inactive position where said first cams are displaced from said disjointing clamps, second cam means mounted adjacent said drum for operating said tail holding clamps, said second cam means being movable to an active position where said second cams are engageable with said tail holding clamps and to an inactive position where said second cams are displaced from said tail holding clamps, moving means for moving said second cams to said active position, and connecting means between said pivot shaft and said moving means.

* * * * *